UNITED STATES PATENT OFFICE.

RAYMOND F. BACON, OF PITTSBURGH, PENNSYLVANIA, ASSIGNOR TO NEWMONT COMPANY, OF NEW YORK, N. Y., A CORPORATION OF MAINE.

PRESERVATION OF CITRUS-FRUIT JUICES.

1,305,244.  Specification of Letters Patent.  Patented June 3, 1919.

No Drawing. Application filed October 20, 1916, Serial No. 126,785. Renewed October 29, 1918. Serial No. 260,176.

*To all whom it may concern:*

Be it known that I, RAYMOND F. BACON, a citizen of the United States, residing at Pittsburgh, Allegheny county, State of Pennsylvania, have invented certain new and useful Improvements in the Preservation of Citrus-Fruit Juices; and I do hereby declare the following to be a full, clear, and exact description of the invention, such as will enable others skilled in the art to which it appertains to make and use the same.

The present invention relates to the preservation of citrus juices; that is to say, the preservation of juices of oranges, grape fruit, lemons, and the like, in such manner as to retain wholly or substantially the original flavor of the fruit, even after long periods of storage or transportation.

Many proposals have heretofore been made for the preservation of citrus juices. It is known, for instance, that when these juices are pasteurized under proper conditions, a product will be obtained which will remain stable for a considerable period. Pasteurization, however, in all cases, alters the flavor of the juice prejudicially and imparts to it a characteristic that differs materially from the juice of the fresh fruit, to a degree that is entirely unacceptable to the ordinary consumer. So also, it has been proposed to preserve citrus fruit juices by means of sulfur dioxid, added to the juice either as such or in the form of a soluble sulfite. This addition has a preservative effect, but the presence of the preservative in the fruit juice has been objected to by various health authorities as a menace to health, and, moreover, there is a natural disinclination on the part of the public to use fruit products containing such preservatives.

The present invention is based upon the fundamental characteristic that a citrus fruit juice, after the treatment to which it has been subjected, is not only possessed of its natural flavor, but is devoid of any preservative, so that it may serve as an article of food, without objection, and in its natural state, and protected wholly from deterioration for a long period of time and under varying conditions of climate and temperature.

In carrying out the invention, the juices are first treated with an antiseptic agent of a character to kill all of the animal and vegetable organisms present. The juices thus treated are permitted to stand until the antiseptic agent has fully performed its function. The antiseptic agent is then removed under antiseptic conditions, and the juices are then bottled or otherwise maintained out of contact with oxygen and free from bacterial contamination until opened for use.

A typical and preferred practice is as follows:

Citrus fruit juice (say orange juice) is treated in a closed vessel with carbon dioxid or other similar gas containing no free oxygen, for a length of time sufficient to remove any oxygen present in solution in the juice. The vessel is fitted with an inlet pipe for the carbon dioxid and also with an outlet pipe therefor, both of these pipes being provided with suitable means, such as cotton strainers or the like, to permit the passage of the carbon dioxid into and out of the vessel, but to exclude ingress of any organisms.

The juice having been thus deoxidized, there is added to it a quantity of sulfur dioxid preferably not exceeding .5% by weight. This amount of sulfur dioxid is readily soluble in the juice, and is as readily driven out after it has subserved its intended function, which is not the case where a notably larger percentage is employed.

The juice so treated is then allowed to stand with the sulfur dioxid in solution therein for a period which, for orange juice, is preferably 70 hours, under normal conditions of pressure and temperature. The sulfur dioxid is then removed in the same vessel.

Several methods are available for removing the sulfur dioxid, but a convenient and quick method is to warm the juice to a temperature not exceeding 50° C., (which temperature has no effect on the flavor of the juice), and, at the same time, passing through the juice a non-oxidizing gas such as carbon dioxid or nitrogen. The carbon dioxid or nitrogen causes the sulfur dioxid to distil out from the juice and it may then be recovered in a suitable condenser. By well known testing methods, the operator is enabled to determine when all of the sulfur dioxid has been removed from the juice. The juice thus treated is then transferred into sealed bottles, under aseptic conditions.

To be sure that the juice will keep, after its transfer into the bottles, it is advisable to use bottles of dark colored glass or the like, or of other material which does not readily transmit the actinic rays of light. Furthermore, the bottle should be well filled with the juice and any space above the juice should be occupied by an indifferent gas such as carbon dioxid or nitrogen. It will, of course, be understood, that during the removal of the sulfur dioxid, a certain quantity of water will distil off from the juice thus tending to concentrate it. The juice may be bottled in a concentrated form, or it may be restored to its original volume by the addition of a sufficient quantity of sterile water before bottling.

It will also be understood that the length of time that the juice should be permitted to stand with the sulfur dioxid, and the actual amount of sulfur dioxid necessary to effect sterilization will vary somewhat with the condition of the fruit from which the juice was expressed, it being apparent that if the fruit expressed should chance to have decayed portions, the number of organisms that must be killed by the sulfur dioxid would be much greater than if perfect fruit is used.

In place of sulfur dioxid itself or any equivalent gas subserving the same function, it is evident that a soluble sulfite, such as sodium acid sulfite might be employed. In this case, on treating the juice at a moderately elevated temperature with carbon dioxid or other non-oxidizing gas, sulfur dioxid would be driven off from the juice and an amount of sodium citrate, chemically equivalent to the sodium acid sulfite used would be left in the juice. While this may be regarded as within the period of scope of the invention, I nevertheless prefer the use of sulfur dioxid itself, or its equivalent, so that the juice, in the condition in which it comes to the consumer, shall be practically in its original natural state.

It will be understood that the removal of the sulfur dioxid from the juice may be effected by distillation *in vacuo*, without the aid of an indifferent gas, or in part assisted thereby. In such case, however, the removal of the sulfur dioxid will, in general, take place less rapidly.

Having thus described my invention, what I claim is:

1. The method of preserving citrus fruit juices, which comprises treating the juices with an antiseptic agent, permitting the juices thus treated to stand until the antiseptic agent has killed the organisms present, removing the antiseptic agent under aseptic conditions and maintaining the juices out of contact with oxygen; substantially as described.

2. The method of preserving citrus fruit juices, which comprises treating the juices with a gaseous antiseptic agent, permitting the juices thus treated to stand until the gaseous antiseptic agent has killed the organisms present, removing the gaseous antiseptic agent under aseptic conditions and maintaining the juices out of contact with oxygen; substantially as described.

3. The method of preserving citrus fruit juices, which comprises expelling from the juices any free oxygen dissolved therein by passing through them a current of a non-oxidizing gas, then treating the juices with an antiseptic agent and permitting them to stand until the antiseptic agent has killed the organisms present, removing the antiseptic agent under aseptic conditions and maintaining the juices out of contact with oxygen; substantially as described.

4. The method of preserving citrus fruit juices, which comprises removing any oxygen present in the juices by passing a current of a non-oxidizing gas therethrough, then treating the juices with an antiseptic agent and permitting the juices thus treated to stand until the antiseptic agent has killed the organisms present, removing the antiseptic agent by distillation, and maintaining the juices out of contact with oxygen; substantially as described.

5. The method of preserving citrus fruit juices, which comprises removing any oxygen present in the juices by passing a current of a non-oxidizing gas therethrough, then treating the juices with an antiseptic agent and permitting the juices thus treated to stand until the antiseptic agent has killed the organisms present, removing the antiseptic agent by distillation assisted by the passage of a non-oxidizing gas through the juices, and maintaining the juices out of contact with oxygen; substantially as described.

6. In the preservation of citrus fruit juices, the method of preparing them for bottling, which comprises deoxidizing the juices, treating the juices with sulfur dioxid and permitting them to stand until the organisms present are destroyed, and then distilling off the sulfur dioxid; substantially as described.

7. In the preservation of citrus fruit juices, the method of preparing them for bottling, which comprises deoxidizing the juices, treating the juices with sulfur dioxid and permitting them to stand until the organisms present are destroyed, and then distilling off the sulfur dioxid with the aid of a non-oxidizing gas passed through the juices; substantially as described.

8. In the preservation of citrus fruit juices, the method of preparing them for bottling, which comprises deoxidizing the juices, treating them with a quantity of sulfur dioxid not exceeding .5% by weight, and then distilling off the sulfur dioxid; substantially as described.

9. In the preservation of citrus fruit juices, the method of preparing them for bottling, which comprises deoxidizing the juices, treating them with a quantity of sulfur dioxid not exceeding .5% by weight, and then distilling off the sulfur dioxid with the aid of a non-oxidizing gas passed through the juices; substantially as described.

In testimony whereof I affix my signature.

RAYMOND F. BACON.